United States Patent [19]

Prenninger

[11] Patent Number: 5,267,014
[45] Date of Patent: Nov. 30, 1993

[54] POSITION AND ORIENTATION MEASUREMENT DEVICE

[75] Inventor: Johann P. Prenninger, Vienna, Austria

[73] Assignee: Bodenseewerk Geratetechnik GmbH, Wien, Fed. Rep. of Germany

[21] Appl. No.: 965,979

[22] Filed: Sep. 28, 1992

[30] Foreign Application Priority Data

Apr. 21, 1992 [DE] Fed. Rep. of Germany ... 9205427[U]

[51] Int. Cl.$^5$ .................. G01B 11/26; G01C 1/00; H04N 7/18
[52] U.S. Cl. .................................. 356/152; 358/107; 359/212
[58] Field of Search .................... 356/141, 152, 4.5; 358/107; 359/212

[56] References Cited

U.S. PATENT DOCUMENTS

| | | | |
|---|---|---|---|
| 3,990,796 | 11/1976 | Foltz | 356/152 |
| 4,134,681 | 1/1979 | Elmer | 356/152 |
| 4,227,807 | 10/1980 | Pond et al. | 356/152 |
| 4,401,886 | 8/1983 | Pond et al. | 356/152 |
| 4,472,054 | 9/1984 | Pouit | 356/352 |
| 4,652,917 | 3/1987 | Miller | 358/107 |
| 4,798,461 | 1/1989 | Pavlin et al. | 356/138 |

FOREIGN PATENT DOCUMENTS

| | | |
|---|---|---|
| 3131335A1 | 6/1982 | Fed. Rep. of Germany . |
| 3421213C2 | 12/1985 | Fed. Rep. of Germany . |
| 3631395A1 | 4/1987 | Fed. Rep. of Germany . |
| 3616393C1 | 7/1987 | Fed. Rep. of Germany . |
| 3710068C2 | 10/1987 | Fed. Rep. of Germany . |
| 3714776A1 | 11/1988 | Fed. Rep. of Germany . |
| 3826149A1 | 2/1990 | Fed. Rep. of Germany . |
| 3921661C1 | 1/1991 | Fed. Rep. of Germany . |
| 3928001A1 | 2/1991 | Fed. Rep. of Germany . |
| 4027732A1 | 3/1992 | Fed. Rep. of Germany . |

OTHER PUBLICATIONS

"Robot Performance Measurements Using Automatic Laser Tracking Techniques", K. Lau et al., Robotics & Computer-Integrated Manufacturing, vol. 2, No. 3/4, pp. 227-236, 1985.

Primary Examiner—Stephen C. Buczinski
Attorney, Agent, or Firm—Lowe, Price, LeBlanc & Becker

[57] ABSTRACT

A device for non-contacting measurement of the orientation in space of a movable measuring object, such as the end-effector of a robot, uses a retro-reflector having three mutually orthogonal reflecting surfaces. This retro-reflector is rigidly attached to the measuring object. Reference marks are provided on the retro-reflector. A laser emits a laser beam. A beam expander optical system in the path of the laser beam provides a collimated light beam of larger diameter than that of said laser beam. The light beam passes through a stationary section, where the path of rays of the light beam is stationary, to a beam directing device. The beam directing device directs collimated light beam onto the retro-reflector. The light beam is returned by the retro-reflector substantially into itself. The beam directing means has movable reflecting surfaces for tracking, with said light beam, the movable measuring object. A semi-transparent mirror is arranged in the stationary section of the returned light beam for deflecting part of this returned light beam to a plane where a picture with a pattern caused by the reference mark is formed. A picture detector is arranged in this plane, and detects the picture of the reference mark and provides corresponding picture information. A processor derives, from this picture information, output data representing the orientation in space of the retro-reflector and thereby the orientation in space of the measuring object.

22 Claims, 14 Drawing Sheets

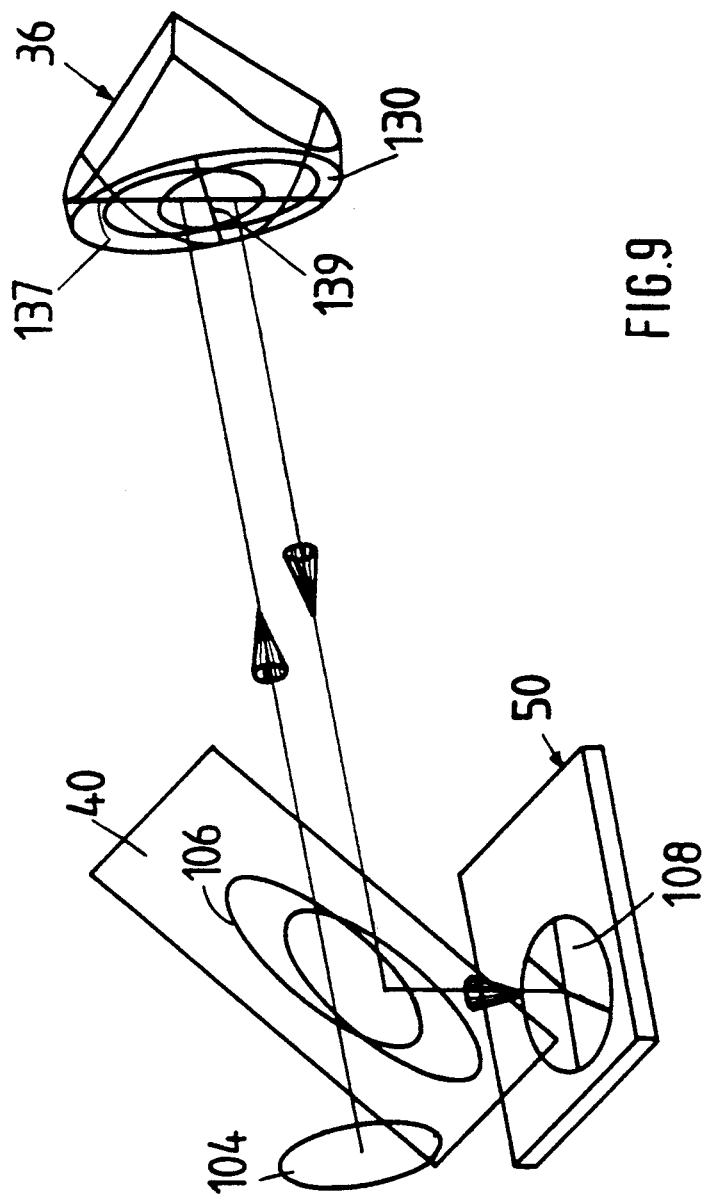

POSITION AND ORIENTATION MEASUREMENT DEVICE

TECHNICAL FIELD

The invention relates to a device for non-contacting measurement of the orientation in space of a measuring object. In particular, the invention relates to the position and orientation measurement of industrial robots by laser tracking techniques in six degrees of freedom.

Part of this invention has been presented in a paper "Real Time 6DOF Measurement Of Robot End-Effectors" by J. P. Prenninger, H. Gander and M. Vincze on the International Robot & Vision Automation Show & Conference, Detroit, Mich., USA, Oct. 22-24, 1991.

The subject matter of the invention has also been described in my thesis "Position and Orientation Measurement of Industrial Robots Using Laser Tracking Techniques in 6 Degrees of Freedom" submitted to the Technische Universität Wien in May 1992.

BACKGROUND ART

There are guidelines and draft international standards regarding the measurement of industrial robots.

Such guidelines include the "VDI-Richtlinion VDI 3861" "KenngröBen für Handhabungsgeräte" Sheet 1 (1980), "KenngröBen für Industrieroboter, Einsatzspexifische KenngröBen" Sheet 2 (1987) and "KenngröBen für Industrieroboter, Prüfung der KenngröBen" Sheet 3 (1987) issued by Verein Deutscher Ingenieure.

There is also a Draft International Standard ISO/DIS 9283 "Manipulating industrial robots—performance criteria and related test methods", issued by the International Organization for Standardization (1988).

Publications by Bernhard Reichling; "Roboter auf dem Prufstand" in "Roboter" March 1986, pp. 22-24 (1986) and "Lasergestützte Positions- und Bahnvermessung von Industrierobotern" Thesis, Universitat Karlsruhe (1988) describe a measuring system for robots. This measuring system is based on a conventional interferometer. The measuring system is capable of measuring in six degrees of freedom. The measuring system consists of a fixed interferometer and a carrier mounted on the tool center point. There is a laser beam of the interferometer. A second beam is emitted by a semiconductor laser diode parallel to the interferometer laser beam. The carrier contains an optical system, which projects both laser beams on three position sensitive detectors. All angles of orientation can be determined unambiguously from the signals provided by the position sensitive detectors. In combination with the interferometer, the deviation of the movement of the robot from a reference trajectory can be measured in six degrees of freedom.

A laser tracking system measuring more than three degrees of freedom is described in a paper by Kam Lau, Robert Hocken and Leonard Haynes "Robot Performance Measurements using Automatic Laser Tracking Techniques" in "Robotics and Computer-Integrated Manufacturing" Vol. 2 No. ¾ pp. 227-236 (1985). A laser beam is deflected by a cardanically mounted first mirror. A plane second mirror is mounted on the end-effector of a robot. This second mirror can be rotated about two axes. The mirror is rotated by a servo system to be always perpendicular to the laser beam. The distance between the two mirrors is measured interferometrically.

These two systems require active elements on the end-effector of the robot. Such elements add weight to the end-effector. There is also the problem of transmitting signals to and from the end-effector.

A thesis by S. Decker "Dynamisches externes RoboterbahnmeBsystem—Ein Beitrag zur Bestimmung dynamischer KenngröBen von Industrierobotern" Technische Universitat Wien, describes a laser tracking system which permits the tracking of the three degrees of freedom of position. A robot carries, at its tool center point, a retro-reflector. The laser beam of an interferometer is deflected by a mirror to this retro-reflector. The mirror can be rotated about two axes to track the retro-reflector. The laser beam is returned by the retro-reflector to the mirror and to the interferometer. The parallel displacement between the incident and returned beam is proportional to the distance of the incident beam from the center point of the reflector. This displacement is measured by means of a position sensitive detector, onto which part of the returned beam is deflected by a semi-transparent mirror. The signal of the position sensitive detector is the error signal of a control device which rotates the mirror so as to minimize the displacement between incident and returned beam. Thereby the deflected laser beam is caused to follow arbitrary movements of the retro-reflector. The laser beam "tracks" the retro-reflector. Using the distance between mirror and retro-reflector as provided by the interferometer and the angles of rotation of the mirror provided by two high-precision angular encoders, the three-dimensional position of the retro-reflector in an instrument-fixed reference coordinate system is computed.

This prior art laser tracking system provides only the position of the retro-reflector and, thereby, of the end-effector of the robot but does not provide the orientation of the retro-reflector.

DISCLOSURE OF THE INVENTION

It is an object of the invention to provide an improved device for non-contacting measurement of the orientation in space of a measuring object.

It is a more specific object of the invention to provide a device for non-contacting measurement of the orientation in space of a measuring object wherein only passive elements need to be attached to the object.

It is another object of the invention to further modify the prior art laser tracking system discussed hereinbefore to permit measurement of six degrees of freedom, namely both position and orientation.

According to the broad concept of the invention, the device comprises a retro-reflector rigidly attached to said object, reference mark means provided on said retro-reflector, light source means for generating a collimated light beam, beam directing means for directing said collimated light beam onto said retro-reflector, said light beam being returned by said retro-reflector substantially into itself, means receiving said returned light beam for forming therefrom a picture of said reference mark means, picture detecting means for detecting said picture of said reference mark means and for providing corresponding picture information, and processing means for deriving, from said picture information, output data representing the orientation in space of said retro-reflector and thereby the orientation in space of said measuring object.

It has been found, that the pattern observed by the picture detecting means permits unambiguous determination of the orientation of the retro-reflector in space.

In a preferred embodiment of the invention, said retro-reflector comprises three mutually orthogonal reflecting surfaces. As the orientation of the retro-reflector is measured, said retro-reflector can be a solid body of transparent material having three mutually orthogonal surfaces, said orthogonal surfaces reflecting light by total reflection and representing said reflecting surfaces. Said reference mark means may be reduced-reflection strips along adjacent edges of said reflecting surfaces. Said reference mark means may, however, comprise separate bodies attached to said retro-reflector and extending into said light beam. Said attached bodies define elongated structures.

Said light source means may comprise a laser emitting a laser beam. Preferably, said light source means further comprise beam expander means in the path of the laser beam for providing a collimated light beam of larger diameter than that of said laser beam.

Said light beam passes through a stationary section, where the path of rays of the light beam is stationary, said means for receiving said returned light beam comprising semi-transparent mirror means arranged in said stationary section of said returned light beam for deflecting part of said returned light beam to a plane where a picture with a pattern caused by said reference mark means is formed, said picture detecting means being arranged in said plane. Said detecting means may comprise a CCD sensor. In one embodiment, said CCD sensor comprises a number of line scan sensors.

Said beam directing means comprise movable reflecting means for tracking, with said light beam, said measuring object, which is movable. The tracking is achieved by detector means responsive to the lateral offset of the incident and returned beams caused by the reflection at said reflecting surfaces of said retro-reflector, and servo means controlled by said detector means for moving said reflecting means to reduce this lateral offset to zero and thereby to track said retro-reflector with said light beam. In addition, the device includes interferometer means for measuring the distance of said measuring object from said light source means to provide a distance information. There are means for sensing the movement of said movable reflecting means of said beam directing means to provide beam direction information, and computing means, to which said distance information and said direction information is applied to provide output data indicative of the position of said retro-reflector, and thereby of said measuring object.

Said beam directing means may comprises a cardanically mounted mirror, said mirror being movable by a first servomotor about a first cardan axis and being movable by a second servomotor about a second cardan axis. In another embodiment, said beam directing means comprises a first reflecting surface in said light beam and rotatable about a first axis of rotation coincident with the beam axis of said light beam, a second reflecting surface parallel to said first reflecting surface, laterally offset with respect to said first axis of rotation and rotatable about said first axis of rotation together with said first reflecting surface, said light beam being deflected by said first reflecting surface to said second reflecting surface, and being further deflected by said second reflecting surface in a direction parallel to said axis of rotation, a third reflecting surface in said further deflected light beam, said third reflecting surface being rotatable with said first and second reflecting surfaces and being arranged to re-deflect said light beam into the direction of a second axis of rotation orthogonal to said first axis of rotation, and a fourth reflecting surface in said re-deflected light beam on said second axis of rotation, said fourth reflecting surface being rotatable about said second axis of rotation to direct said light beam radially therefrom.

Preferred embodiments of the invention will now be described with reference to the accompanying drawings.

BRIEF DESCRIPTION OF THE DRAWINGS

FIG. 9 shows, in an illustration similar to FIG. 2, still another type of marks applied to the retro-reflector.

PREFERRED EMBODIMENTS OF THE INVENTION

Figure 1:
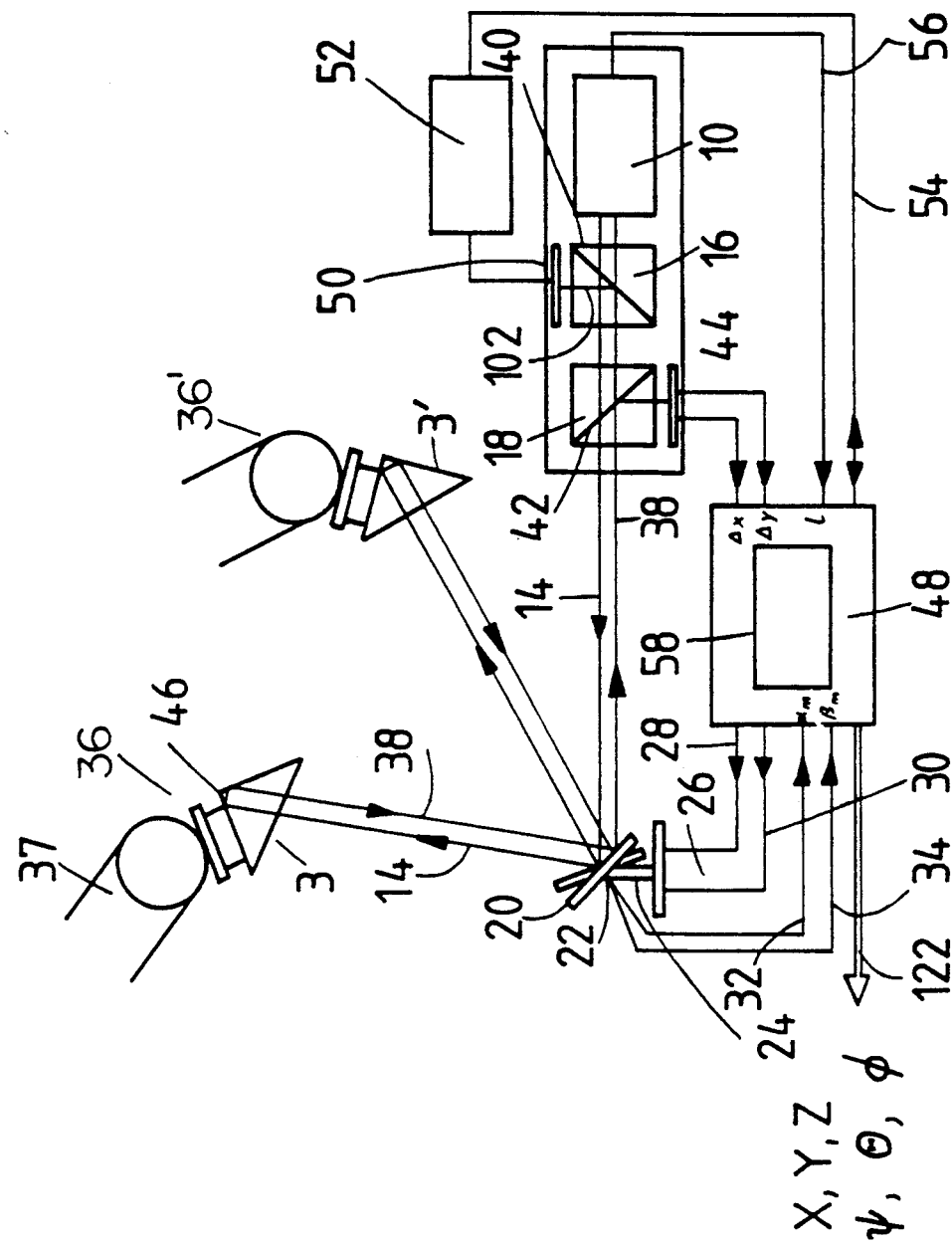
FIG. 1 is a schematic illustration of a laser tracking system with a device for non-contacting measurement of the orientation in space of a measuring object.
Figure 4:
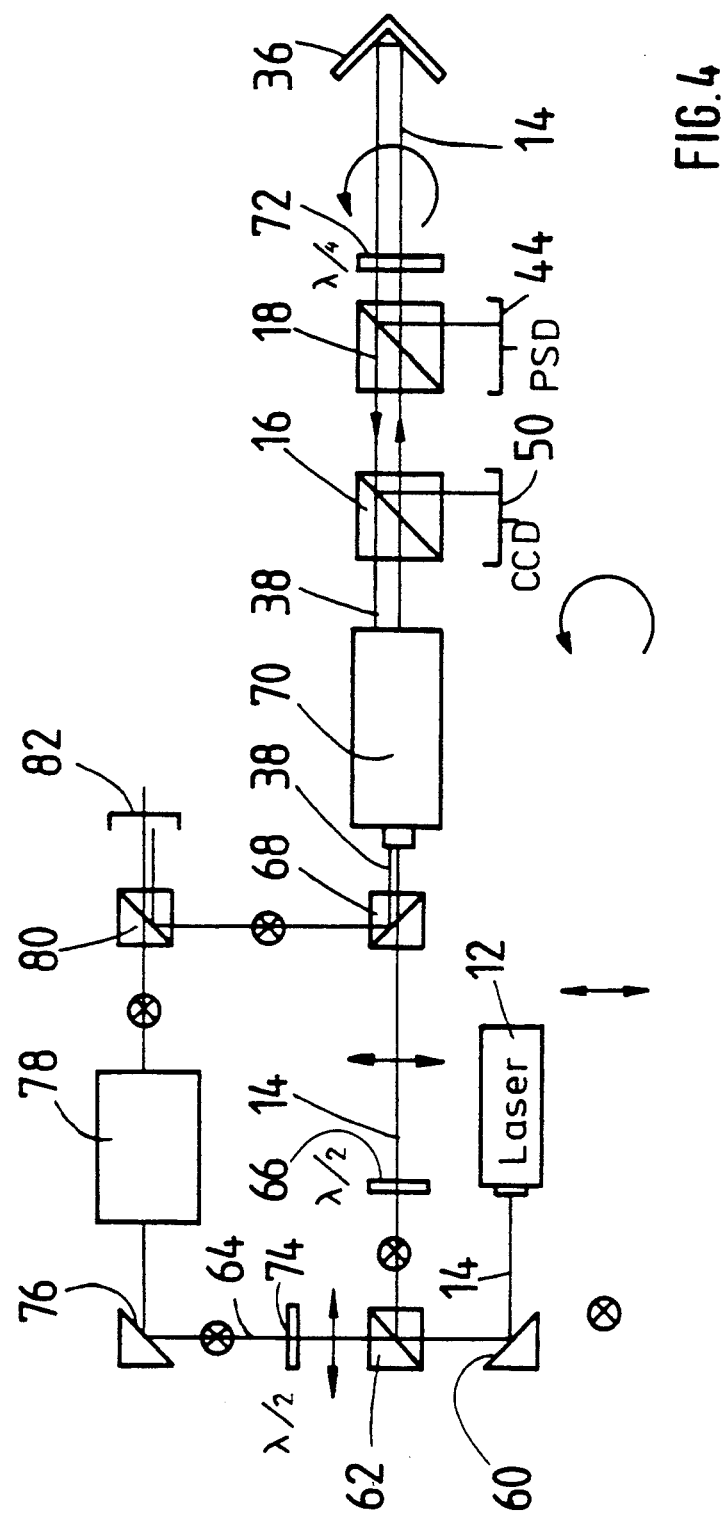
FIG. 4 is a more detailed illustration of the interferometer used in the device of FIG. 1.

Referring to FIG. 1, numeral 10 designates a heterodyne interferometer. The interferometer 10 includes a Helium-Neon laser 12 as light source. This is shown in FIG. 4. The laser 12 emits a laser beam 14. The laser beam 14 passes straight through a first beam splitter 16 and through a second beam splitter 18. The laser beam then hits a mirror 20. Mirror 20 is rotatably mounted about a first axis 22 in a support 24. The support 24, in turn, is mounted for rotation about a second axis 26 orthogonal to the first axis 22. The second axis is vertical in FIG. 1. The mirror 20 can be rotated about these axes 22 and 26 by servomotors (not shown), which are energized by control signals on lines 28 and 30, respectively. The angular position of the mirror about the two axes is detected by two highly accurate, high resolution angle sensors (not shown). These angle sensors provide information about the angular positions of the mirror 20 about the two axes 22 and 26 on lines 32 and 34, respectively.

The mirror 20 deflects the laser beam 14 towards a retro-reflector 36. The retro-reflector 36 is rigidly attached to the movable end-effector 37 of a robot. The laser beam 14 is returned by the retro-reflector 36 as returned beam 38 parallel to its direction of incidence. The returned beam 38 is again deflected by the mirror 20 and is re-directed towards the laser 10. Also here, the returned beam 38 is parallel to the outgoing laser beam 14. In the path of rays of the returned beam 38, there are the inclined beam splitting surfaces 40 and 42 of the beam splitters 16 and 18, respectively.

The beam splitter 18 directs part of the returned beam 38 onto a position sensitive detector 44. The position sensitive detector 44 provides output signals indicative of the lateral deviations of the center point 46 of the retro-reflector 36 from the axis of the laser beam 14. These signals $\Delta x$ and $\Delta y$ are applied to a processor 48.

The beam splitter 16 directs part of the returned beam 16 onto a picture detecting sensor 50. The picture detecting sensor 50 is a CCD sensor. The picture detecting sensor is connected to a picture processing device 52. The picture processing device 52 provides information about the orientation of the retro-reflector 36 relative to the laser beam 14. This information is applied to processor 48 through a data line 54.

The interferometer 10 provides information with respect to the distance 1 of the retro-reflector 36 from the interferometer 10, measured along the path of the laser beam 14. Also this signal is applied to the processor 48 through line 56.

The processor 48 includes a controller 58, symbolized by a box. The controller 58 receives the error signals $\Delta x$ and $\Delta y$, and provides output signals on lines 28 and 30 for the control of the mirror 20 about its two axes 22 and 26, respectively.

The laser and interferometer arrangement is shown in greater detail in FIG. 4.

The beam 14 from the laser 12 is deflected by mirror 60 and is split into two partial beams by a polarizing beam splitter 62. The beam reflected towards the retro-reflector is still designated by numeral 14. The beam passing straight through the beam splitter is designated by reference numeral 64.

Reflected beam 14 is polarized normal to the plane of the paper in FIG. 4. A half-wave plate 66 provides polarization parallel to the plane of the paper in FIG. 4. The beam thus passes through a polarizing beam splitter 68 and enters a beam expander 70. The beam expander is an optical system which converts the narrow laser beam into a beam having a larger diameter. The thus expanded beam 14 passes through the two polarizing beam splitters 16 and 18. A quarter-wave plate 72 provides a circularly polarized beam. This beam 14 is directed, as shown in FIG. 1, to the retro-reflector 36. The deflection of the beam 14 by mirror 20 is not shown in FIG. 4.

The beam 64, which has passed straight through the polarizing beam splitter 62, is polarized parallel to the plane of the paper in FIG. 4. Beam 64 passes through a half-wave plate 74 to provide polarisation normal to the plane of the paper in FIG. 4. This beam is deflected by a mirror 76. The deflected beam 64 is substantially parallel to beam 14. Beam 64 passes through a modulator 78. The modulated beam emerging from modulator 78 passes straight through another polarizing beam splitter 80 and impinges upon a photo-detector 82.

Figure 2:
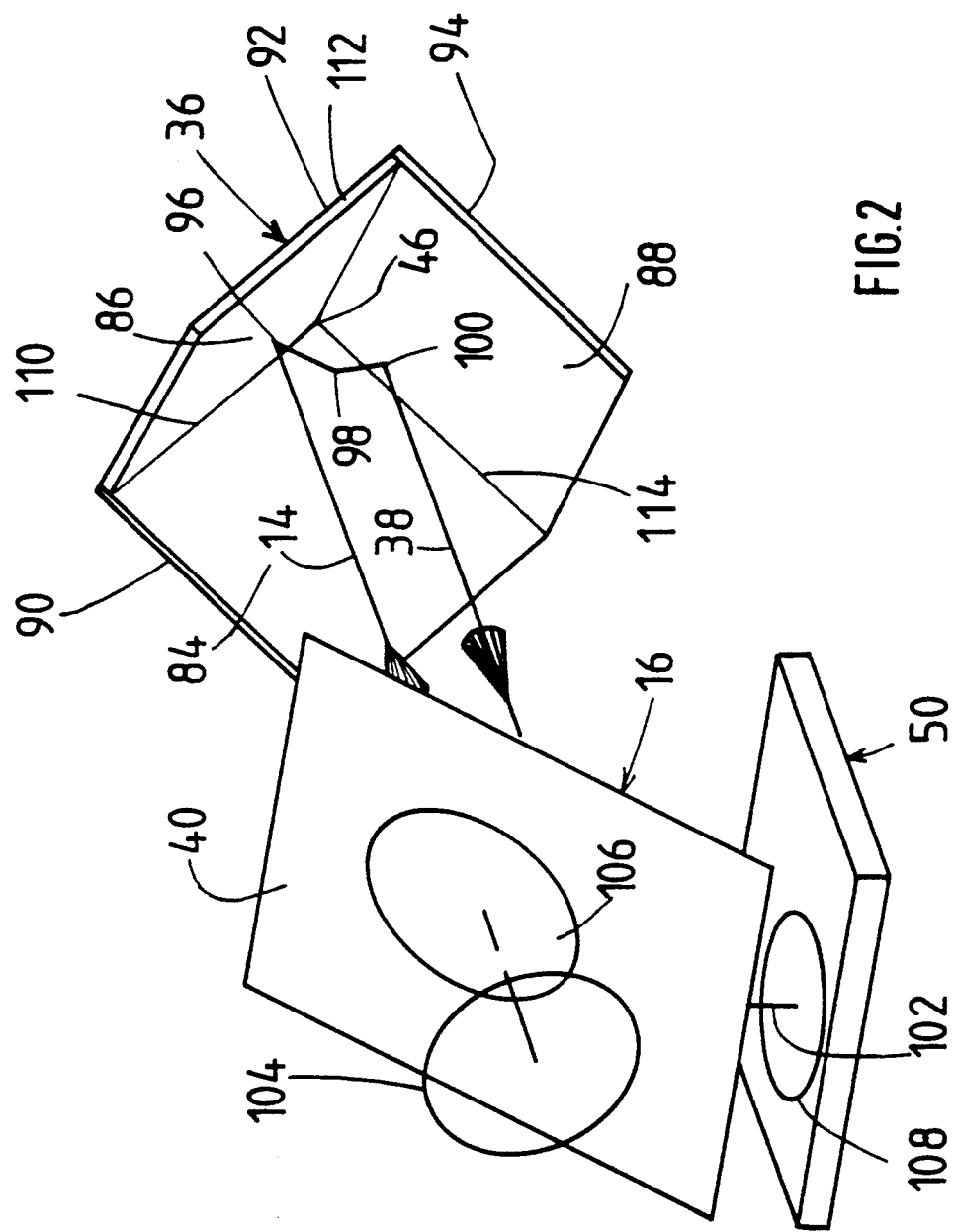
FIG. 2 is a schematic-perspective illustration of the device for the measurement of the orientation of a retro-reflector rigidly attached to the measuring object.

The operation of the retro-reflector 36, the beam splitter 16 and the CCD picture sensor is shown in a schematic-perspective illustration in FIG. 2.

The retro-reflector 36 has three mutually orthogonal reflecting surfaces 84, 86 and 88. In FIG. 2, these reflecting surfaces 84, 86 and 88 are provided by three mirrors 90, 92 and 94, respectively. The mirrors 90, 92 and 94 form an inner corner of a cube. As can be seen in FIG. 2, an incident beam 14 hits, for example, the reflecting surface 86 at 96, is then reflected to surface 84. The beam hits the surface 84 at 98. Surface 84 reflects the beam 14 towards surface 86. The beam hits the surface 86 at 100. The surface 86 reflects the beam and returns it, parallel to the direction of the incident beam 14, as the returned beam 38.

The returned beam 38 gets to the beam splitter 16 after deflection by the mirror 20. This deflection is not shown in simplified FIG. 2. The inclined surface 40 reflects part of the returned beam 38 as beam 102 to the CCD picture sensor 50. Because of the beam expander 70, the laser beam has a rather large diameter. In FIG. 2, numeral 104 designates the circular cross section of the returned beam 38, numeral 106 designates the elliptical intersection of the beam 38 with the surface 40, and numeral 108 designates the circular cross section of the beam 102 reflected by the surface 40.

Figure 3:
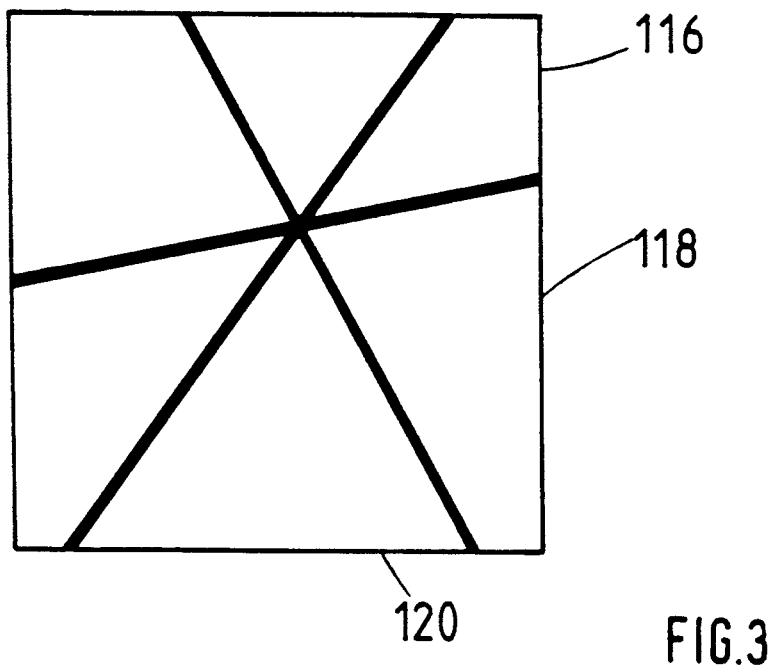
FIG. 3 is a typical example of a picture or pattern obtained from the returned light beam and showing the marks on the retro-reflector, these marks consisting, in this case, of blackened edges of the reflecting surfaces forming the retro-reflector.

The edges 110, 112 and 114 along which the three mirrors are connected to form the retro-reflector 36 are blackened to provide low-reflectivity strips. These low-reflectivity strips form a pattern of three intersecting straight lines in a picture generated in the plane of the CCD picture sensor. Such a picture is shown in FIG. 3. If you look into a retro-reflector of the present type, you do not only see, for example, blackened edge 114 but also the mirror image of this blackened edge in mirror 86, which appears as straight continuation of edge 114. A similar pattern is observed by the CCD picture sensor 50. The angles between these three straight lines 116, 118 and 120 are indicative of the orientation of the retro-reflector relative to the direction of laser beam 14.

The picture processing device 52 evaluates the picture observed by the CCD picture sensor 50 and, together with processor 48 provides the orientation of the retro-reflector 36 in a device-fixed coordinate system.

The polarizing beam splitter 18 similarly directs part of the returned beam to the position sensitive detector 44. The position sensitive detector 44 provides error signals indicative of the deviation of the beam axis of laser beam 14 from the center point 46 of the retro-reflector 36. The controller 58 through lines 28 and 30 controls the mirror angles $\alpha_m$ and $\beta_m$ to minimize the deviation. Thus the expanded laser beam 14 is caused to continuously track the retro-reflector 36.

The portion of the returned light beam 38, which has passed straight through the polarizing beam splitters 18 and 16, passes through the beam expander 70 in reverse direction and is deflected by the polarizing beam splitter 68. The light deflected by the polarizing beam splitter 68 is polarized normal to the plane of the paper in FIG. 4, the same way as the beam 64 passing through the modulator 78. The two beams 64 and 38 are superimposed by the polarizing beam splitter 82 and caused to exhibit interferences at photo-detector 82. From the counting of interference fringes, variations of the distance 1 can be measured with great accuracy. If the initial distance is known, the interferometer 10 provides the absolute value of the distance 1. This is a known technique and, therefore, is not described in detail.

From the evaluation of the picture received by CCD picture sensor 50, the angles of orientation of the retro-reflector 36 relative to a laser beam-fixed coordinate system can be determined. From the angles $\alpha_m$ and $\beta_m$ measured at the mirror 20, the direction of laser beam 14 can be derived. This permits computation of the orientation of the retro-reflector 36 relative to a device-fixed coordinate system.

The orientation of the laser beam 14 and the distance 1 of the retro-reflector provide the coordinates x, y and z in a device-fixed coordinate system.

The orientation $\phi, \theta, \psi$ of the retro-reflector 36 (and thereby of the end-effector 37) and the position x, y, z of the retro-reflector 36 in the device-fixed coordinate system is outputted at an output 122 of the processor 48.

Figure 5:
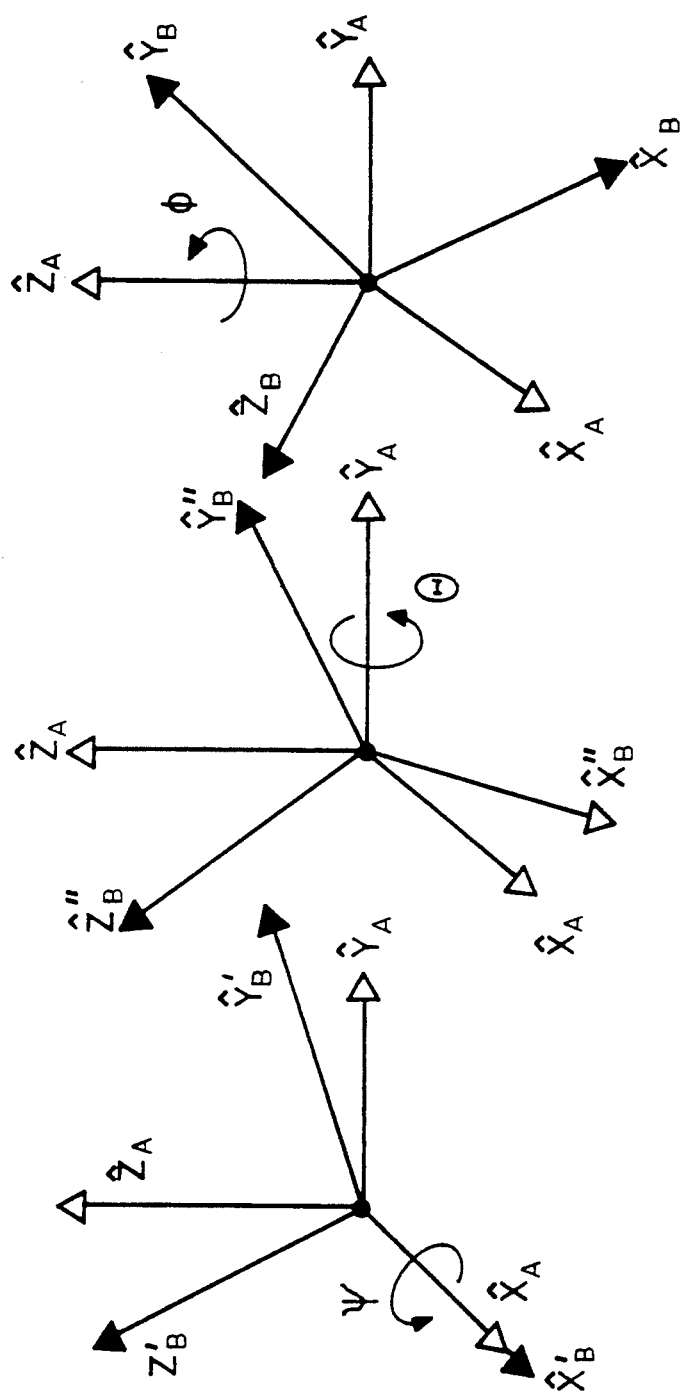
FIGS. 5(A)–5(C) illustrate the meaning of the pitch, roll and yaw angles used to describe the orientation of the measuring object relative to a device-fixed reference coordinate system.

The computations to be carried out by the processor 48 will be summarized briefly hereinbelow with reference to FIGS. 5 and 6.

At first, the deflection of the laser beam 14 by the mirror 20 is disregarded as in FIG. 2. The orientation angles of the retro-reflector 36 with respect to a coordinate system fixed with respect to the laser beam 14 can be derived from the picture obtained in the plane of the CCD picture sensor 50. Such a picture is shown in FIG. 3. The orientation thus obtained is then to be transformed into a device-fixed coordinate system taking into account the deflection angles of the mirror 20 and the deflection angles of the laser beam 14 caused thereby.

The reference direction of the retro-reflector 36 is a straight line along the diagonal of the notional cube defined by the three mirrors 84, 86 and 88. This straight line passes through the center point 46 of the retro-reflector 36. A coordinate system is defined by the three mirror edges 110, 112 and 114 of the retro-reflector 36. The orientation of the retro-reflector 36 relative to a stationary coordinate system is defined by three angles through which the stationary coordinate system would have to be rotated in order to coincide with the retro-reflector coordinate system. In the present case, the roll, pitch and yaw angles are used to define this orientation. This is illustrated in FIG. 5. The stationary coordinate system is designated by "A". This stationary coordinate system uses the direction of the laser beam 14 as its z-axis, the remaining two axes being orthogonal thereto. The coordinate system referenced to the retro-reflector is designated "B". The "B"-coordinate system is first rotated about the stationary $x_A$-axis by the yaw angle $\psi$. Then the "B"-coordinate system is rotated about the stationary $y_A$-axis by the pitch angle $\theta$. Eventually the "B"-coordinate system is rotated about the stationary $z_A$-axis by the roll angle $\phi$.

Figure 6:
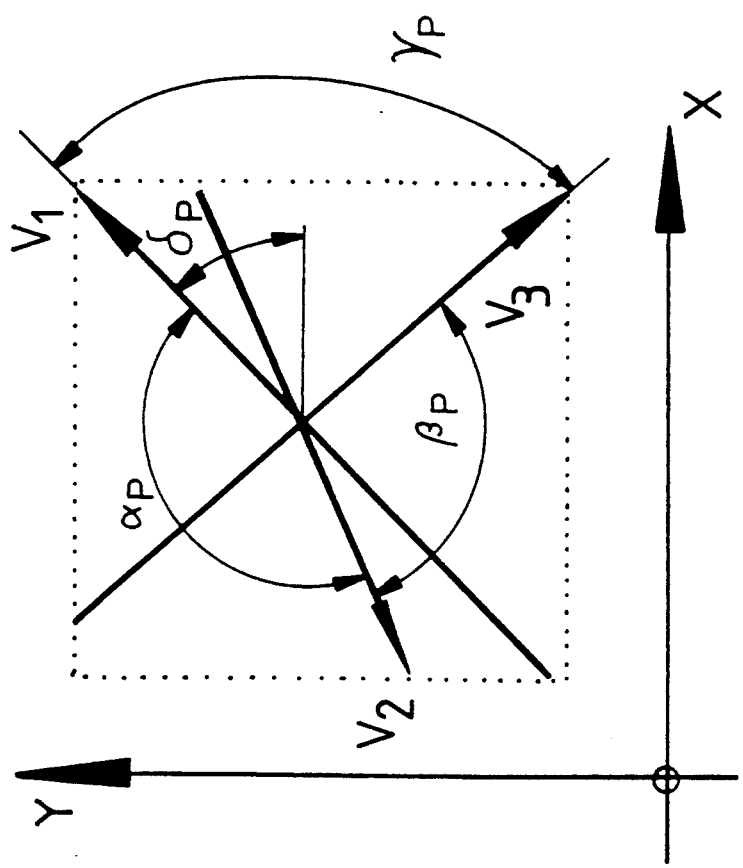
FIG. 6 illustrates the designation of the various angles observed in the picture of the marks generated by the beam returned by the retro-reflector.

FIG. 6 illustrates the angles $\alpha_p, \beta_p, \gamma_p$ and $\delta_p$ appearing in the picture, which is observed in the plane of the CCD picture sensor 50. As explained with reference to in FIG. 3, this picture contains a pattern of three straight lines representing the edges 110, 112 and 114 of the retro-reflector 36 and their mirror images. These straight lines are defined by three vectors $V_1, V_2$ and $V_3$. The angles mentioned above are the angles between these vectors and the angle between vector $V_1$ and the direction of the x-axis of the "A"-coordinate system mentioned above. It can be shown, that the roll, pitch and yaw angles defined with reference to FIG. 5 and the angles of FIG. 6 are interrelated by the following equations:

$$\theta = -\arcsin\left(\sqrt{\frac{2}{3\tan\alpha_p\tan\gamma_p}} - \sqrt{\frac{-1}{6\tan(\alpha_p + \gamma_p)\tan\alpha_p}} - \sqrt{\frac{-1}{6\tan\gamma_p\tan(\alpha_p + \gamma_p)}}\right)$$

$$\phi = \arcsin\left(\frac{1}{\cos\theta}\left(\sin\delta_p\sqrt{\frac{-2\cos(\gamma_p + \alpha_p)}{3\sin\alpha_p\sin\gamma_p}} - \right.\right.$$

$$\sin(\delta_p + \alpha_p)\sqrt{\frac{\cos\gamma_p}{6\sin\alpha_p\sin(\alpha_p + \gamma_p)}} +$$

$$\left.\left. -\sin(\delta_p - \gamma_p)\sqrt{\frac{\cos\alpha_p}{6\sin\gamma_p\sin(\alpha_p + \gamma_p)}}\right)\right)$$

$$\psi = \arcsin\left(\frac{1}{\cos\theta}\sqrt{\frac{-1}{2\tan(\alpha_p + \gamma_p)\tan\alpha_p}} - \right.$$

$$\left.\frac{1}{\cos\theta}\sqrt{\frac{-1}{2\tan\gamma_p\tan(\alpha_p + \gamma_p)}}\right)$$

This provides the orientation of the retro-reflector 36 relative to a coordinate system movable with the laser beam 14 upon rotation of the mirror 20 about its two axes 22 and 26. It is desired to obtain the orientation of the retro-reflector 36 with reference to a stationary, "device-fixed38 coordinate system. This requires a further transformation:

$$A_o = \begin{pmatrix} \cos 2\phi & -2\cos\alpha\sin\beta\cos\phi & -2\sin\alpha\cos\phi \\ 2\cos\alpha\sin\beta\cos\phi & \dfrac{\sin^2\alpha \text{vers}2\phi}{\sin^2\phi} + \cos 2\phi & -\dfrac{\sin\alpha\cos\alpha\sin\beta\text{vers}2\phi}{\sin^2\phi} \\ 2\sin\alpha\cos\phi & -\dfrac{\sin\alpha\cos\alpha\sin\beta\text{vers}2\phi}{\sin^2\phi} & \dfrac{\cos^2\alpha\sin^2\beta\text{vers}2\phi}{\sin^2\phi} + \cos 2\phi \end{pmatrix}$$

wherein $\alpha$ and $\beta$ are the elevation and azimuth angles of the laser beam 14 directed to the retro-reflector 36 and $\phi$ is the angle between the laser beam 14 emitted by the interferometer 10 and the vector perpendicular to the plane of the mirror 20.

Figure 7:
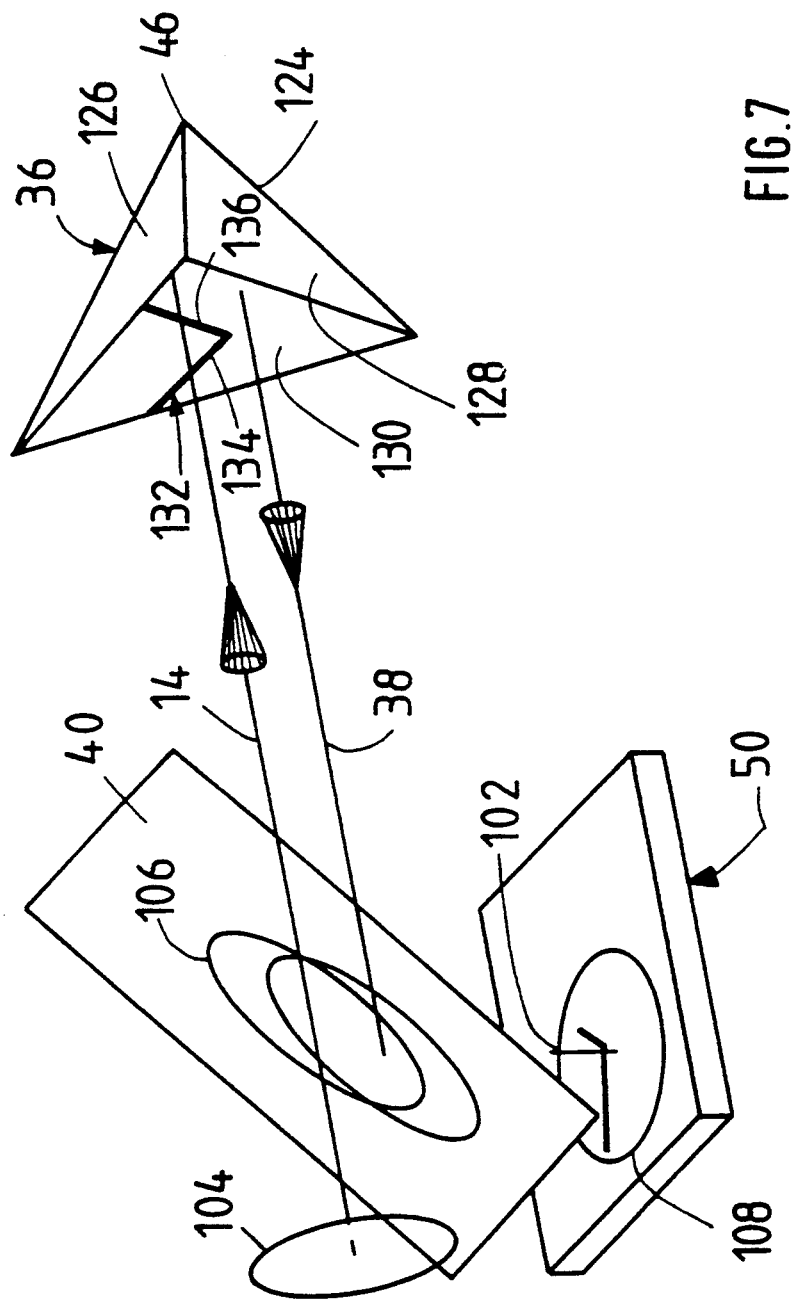
FIG. 7 shows, in an illustration similar to FIG. 2, a different type of marks applied to the retro-reflector.

FIG. 7 shows another embodiment in a schematic-perspective illustration similar to FIG. 2. Corresponding elements are designated by the same reference numeral in both figures.

In the embodiment of FIG. 7, the retro-reflector 36 is a solid glass body having three mutually orthogonal surfaces 124 (the rear surface in FIG. 7), 126 and 128, and a front surface 130. The three mutually orthogonal surfaces define one corner of a notional cube. A reference direction is defined by a diagonal of this notional cube passing through the center point 46. The front surface is normal to this reference direction. The three mutually orthogonal surfaces are reflecting by total reflection.

The front surface 130 carries a mark 132 in the form of two mutually orthogonal, etched lines 134 and 136.

The laser beam 14 and the returned beam 38 are shown with a slight lateral offset. This offset will be detected by the position sensitive detector 44. The signals from the position sensitive detector will be used, as described, to track the retro-reflector 36 with the laser beam 14.

Figure 8:
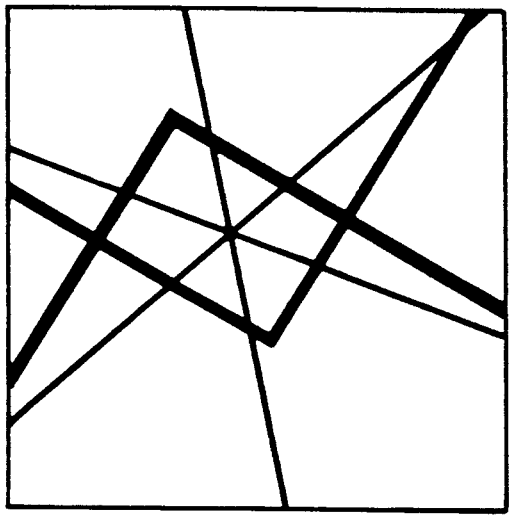
FIG. 8 is a typical example of a picture or pattern obtained from the returned light beam and showing the marks applied to the retro-reflector of FIG. 6.

The three mutually orthogonal surfaces cause the incident beam 14 to be returned parallel to the direction of incidence ar returned beam 38. Part of the beam 38 is deflected towards the CCD picture sensor 50. FIG. 8 shows the picture obtained, with this type of mark 132, in the plane of the CCD picture sensor. Again the lines 134 and 136 appear twice in this picture, namely once directly and once as a mirror image.

Evaluation of this picture can be accomplished in a similar way as that described with reference to FIGS. 1 to 6.

The embodiment of FIG. 9 is similar to that of FIG. 7. Corresponding elements bear the same reference numeral in both figures. The front surface 130 carries an etched mark consisting of two intersecting straight lines 136 and 138.

Figure 10:
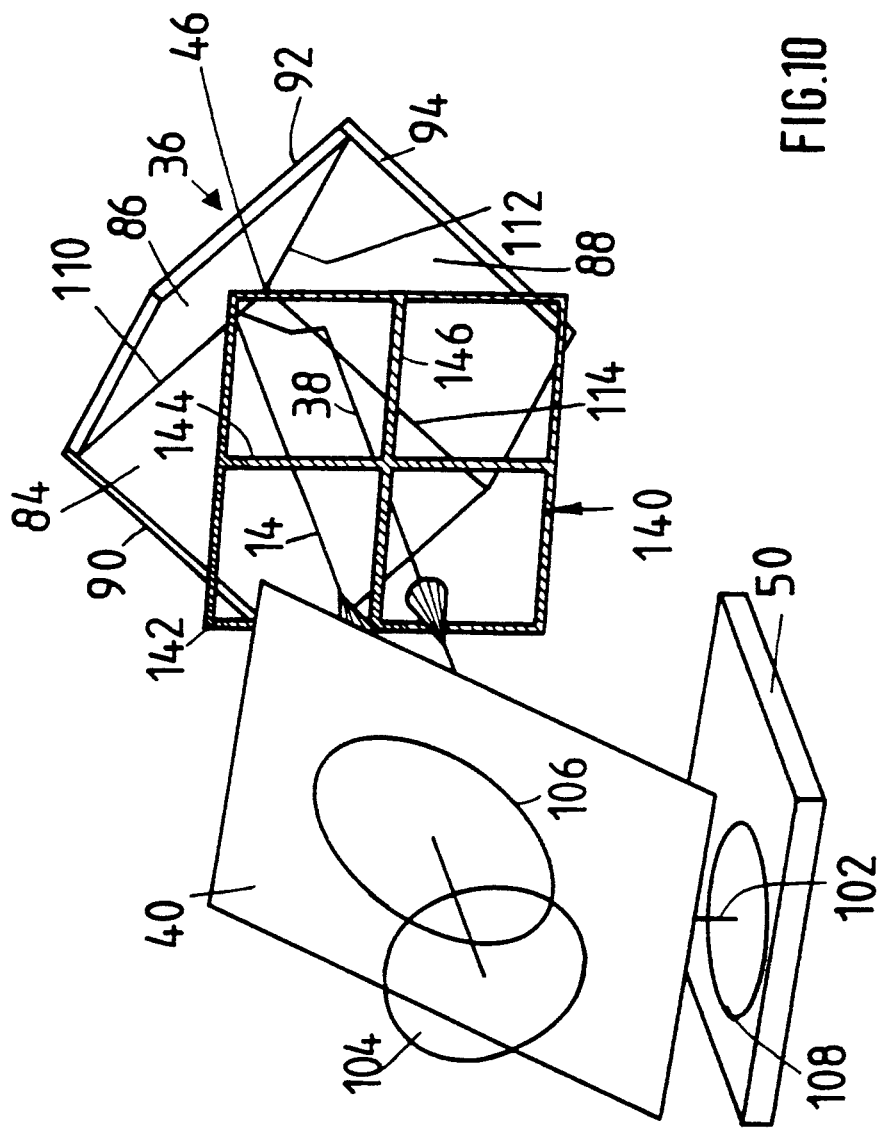
FIG. 10 shows, in an illustration similar to FIG. 2, a further type of marks applied to the retro-reflector.

The embodiment of FIG. 10 is similar to that of FIG. 2. Corresponding elements bear the same reference numeral in both figures. In the embodiment of FIG. 10, the retro-reflector 36 consists of three mirrors 90, 92 and 94. The three mirrors are mutual orthogonal and form three reflecting surfaces 84, 86 and 88, respectively, on the inner surface of a cube corner. The mark consists of a separate body 140 rigidly attached to the retro-reflector 36. In the embodiment of FIG. 10, this rigid body consists of a square frame 140 and a pair of intersecting elements 144 and 146 like the cross-bars of a window. The body 140 consists of transparent or translucent plastics. This permits the CCD picture sensor to discriminate between the shadows or pictures of the edges 110, 112 and 114 of the mirrors 90, 92 and 94 and the structure of the body 140.

This body 140 produces also a shadow pattern in the picture on the CCD picture sensor 50. This pattern permits determination of the orientation of the retro-reflector 36. Evaluation of this picture can be accomplished in a similar way as that described with reference to FIGS. 1 to 6.

Figure 11:
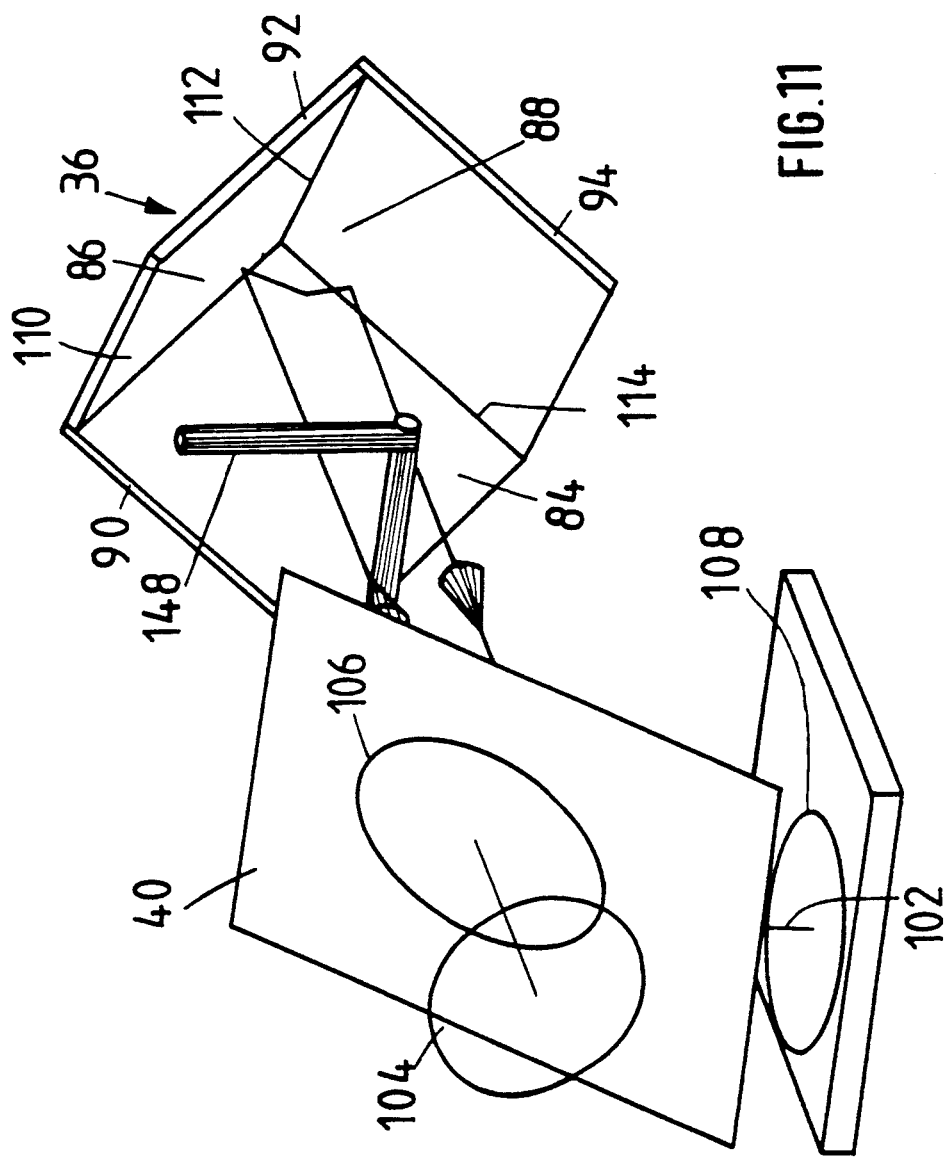
FIG. 11 shows, in an illustration similar to FIG. 2, a retro-reflector with a wire attached thereto as a mark.

The embodiment of FIG. 11 is similar to that of FIG. 10. Corresponding elements bear the same reference numeral in both figures. In the embodiment of FIG. 11, the retro-reflector 36 again consists of three mirrors 90, 92 and 94. The three mirrors are mutual orthogonal and form three reflecting surfaces 84, 86 and 88, respectively, on the inner surface of a cube corner. The mark, also in this embodiment, consists of a separate body 148 rigidly attached to the retro-reflector 36. In the embodiment of FIG. 11, this rigid body consists of an L-shaped wire. This wire produces a similar pattern as the etched lines 134, 136 on the front surface 130 of the retro-reflector 36 in FIG. 7.

Figure 12:
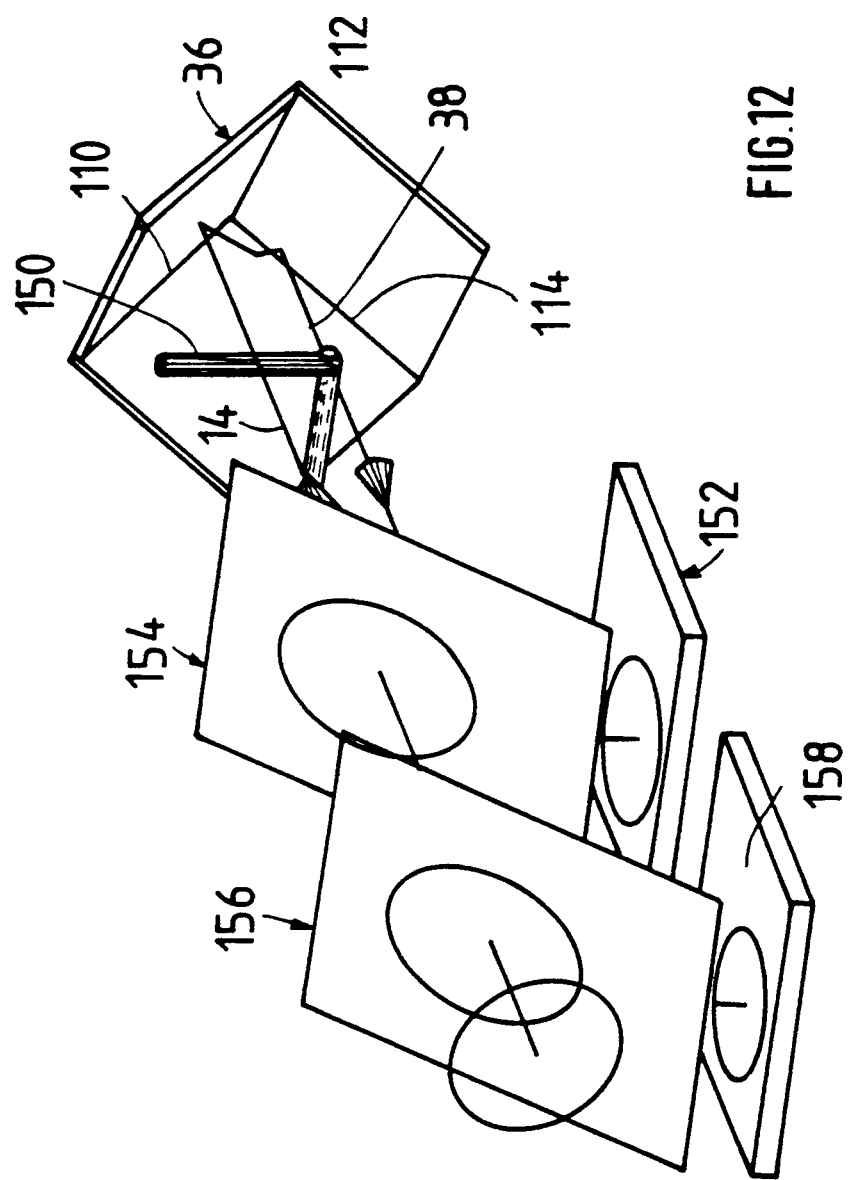
FIG. 12 shows, in an illustration similar to FIG. 2, another arrangement of with a position sensitive detector in addition to a CCD picture sensor.

In the embodiment of FIG. 12, the retro-reflector 36 has no blackened mirror edges. Only a L-shaped wire 150 is attached to the retro-reflector 36. The picture of the wire 150 is provided by the returned beam 38 on a CCD picture sensor 152. To this end, part of the returning beam 38 is deflected by a first beam splitter 154. Part of the returned beam 38 passes straight through the first beam splitter 154 and gets to a second beam splitter 156. The second beam splitter 156 again deflects part of the returned beam 38. This deflected part is directed on a position sensitive detector 158.

Normally, the intersection of the pictures of the mirror edges 110, 112 and 114 provides an indication of the center point 46 of the retro-reflector 36. If the mirror edges 110, 112 and 114 are not blackened, the information about the center point has to be derived from elsewhere. In the embodiment of FIG. 12, the position sensitive detector 158, which responds to the deviation of the laser beam from the center point, provides this information. In the complete measuring system as illustrated in FIG. 1, this position sensitive detector 156 is provided anyhow.

The measuring of the pictures (frames per second) by the CCD picture sensor should be accomplished at a rather high measuring rate in order to permit accurate tracking of the retro-reflector. The measuring rate ought to be more than 1 kilocycles per second. In order to permit higher measuring rates, which cannot be achieved by conventional CCD picture sensors, the CCD picture sensor, preferably, consists of a plurality of spaced CCD line sensors. Though such CCD line sensors detect only a fraction of the total picture, unambiguous reconstruction of the whole picture is possible. The picture consists of simple linear structures only. Therefore a few lines of this picture provide all the information required. Thereby, however, the number of data per measuring step is reduced considerably. It becomes possible to increase the measuring rate accordingly.

Figure 13:
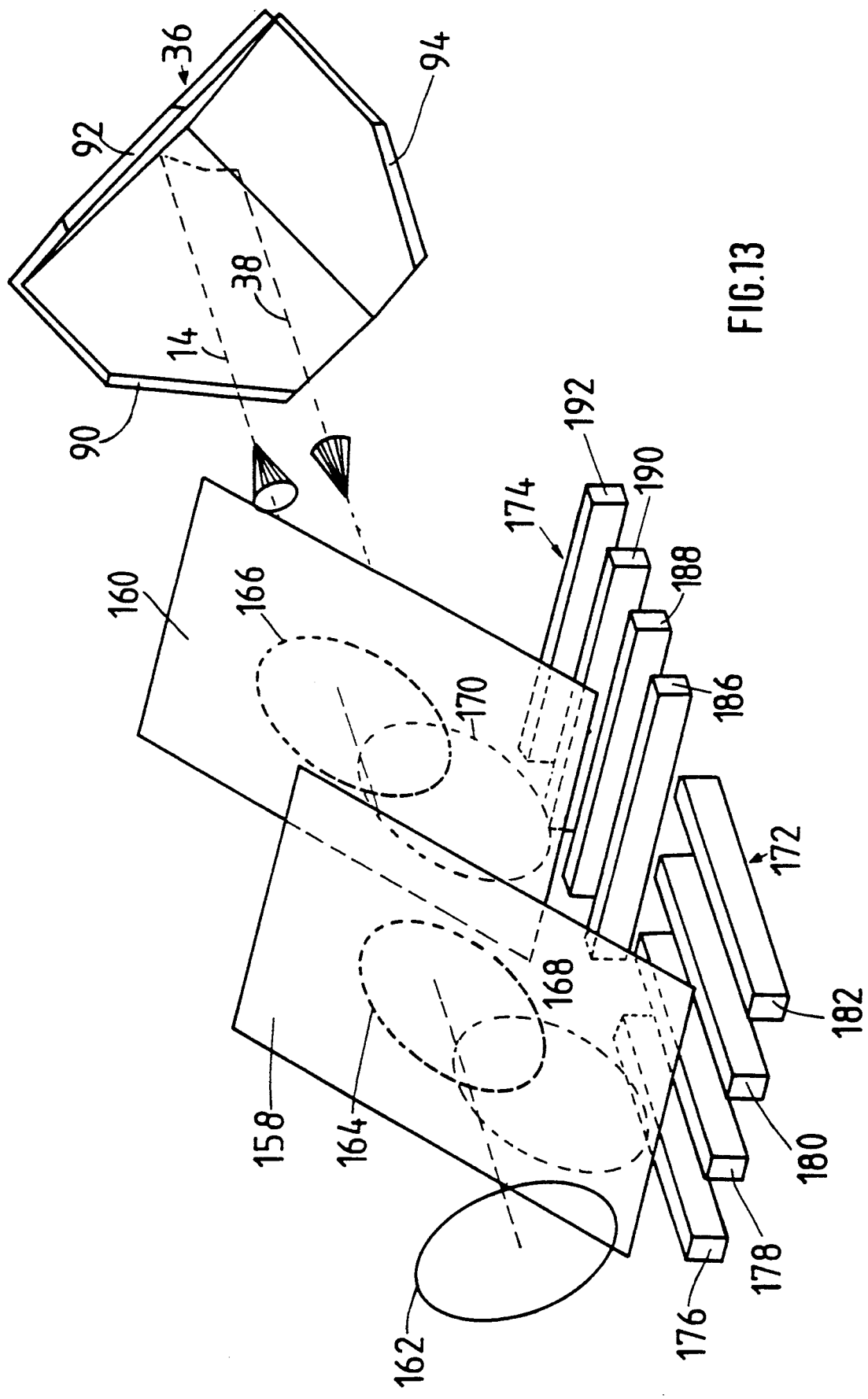
FIG. 13 shows, in an illustration similar to FIG. 2, still another arrangement with line scan CCD sensors.

Such an arrangement is illustrated in FIG. 13. FIG. 13 is a schematic-perspective view, similar to FIG. 13, of a device using a plurality of longitudinal and transversal CCD line sensors.

Referring to FIG. 13, the retro-reflector 36 consists of three mutually orthogonal mirrors 90, 92 and 94. Beam splitters 158 and 160 are arranged in the paths of the incident laser beam 14 and of the returned light beam 38. The incident light beam 14 passes straight through the beam splitters 158 and 160. Numeral 162 designates the cross section of the expanded incident laser beam 14. The laser beam 14 intersects the inclined planes of the beam splitters 158 and 160 in ellipses 164 and 166, respectively. The returned light beam 38 intersects the planes of the beam splitters 158 and 160 in ellipses 168 and 170, respectively. Parts of the returned light beam 38 are reflected by the beam splitters 158 and 160 towards detector arrangements 172 and 174, respectively. The detector arrangement 172 consists of three CCD line sensors 176, 178, 180 and 182. These sensors are arranged parallel to each other and to the undeflected, returned beam 38 in a plane, which is normal to the direction of the beam portion deflected by beam splitter 158. The detector arrangement 174 consists of four CCD line sensors 186, 188, 190 and 192. These sensors are arranged parallel to each other and transverse to the undeflected, returned beam 38 in a plane, which is normal to the direction of the beam portion deflected by beam splitter 160.

Figure 14B:
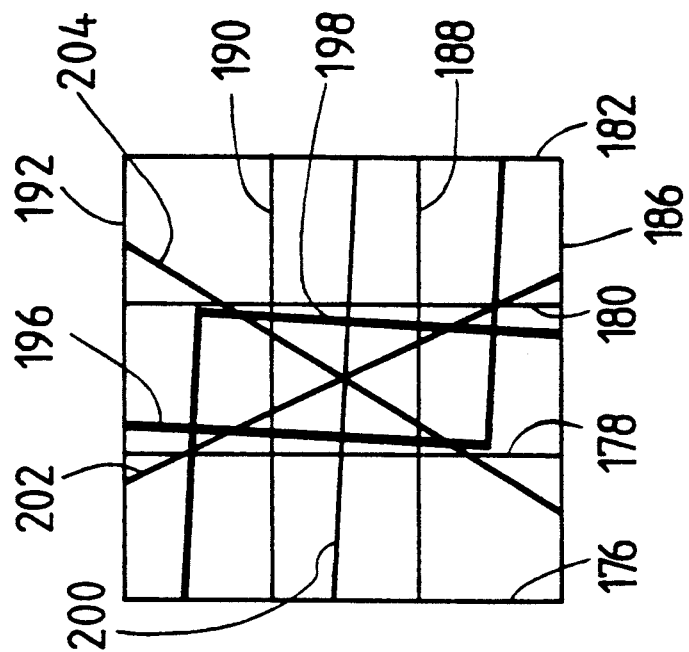
FIGS. 14A and 14B illustrate the information obtained with an arrangement of FIG. 12.

FIG. 14B shows schematically how a picture or shadow of a body attached to the retro-reflector, such as the wire 148 of FIG. 11, is formed in the plane of each of the detector arrangements 172 and 174. This picture is a "L" 196 together with its mirror image 198. Also formed are straight line pictures 200, 202 and 204 caused by the edges of the mirrors 90, 92 and 94. The longitudinal CCD line sensors 176, 178, 180 and 182 are represented by vertical straight lines in FIG. 14B. The transversal CCD line sensors 186, 188, 190 and 192 are designated by horizontal straight lines in FIG. 14B.

Figure 14A:
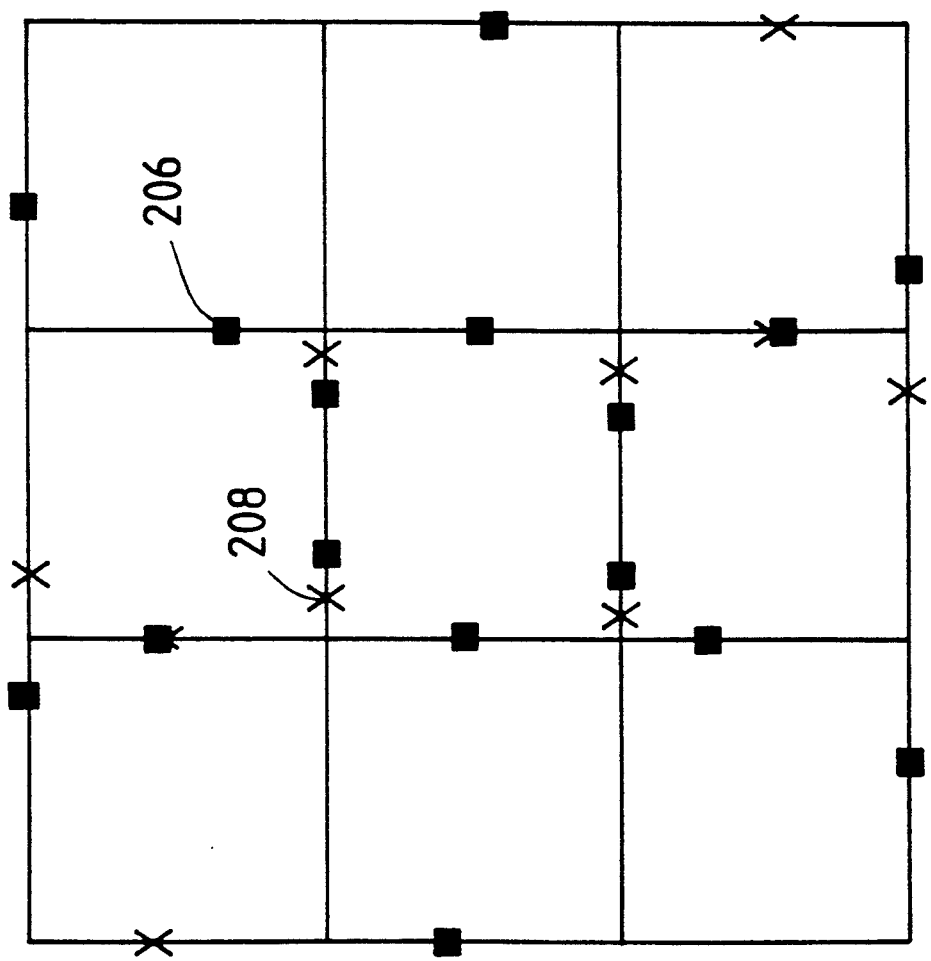

FIG. 14A illustrates the various sensor elements of the CCD line sensors which detect a shadow of the picture pattern shown in the righthand portion. These sensor elements are located at the intersections of the pattern lines with the sensor "lines". The detector elements 206 shown by squares represent the straight lines 200, 202 and 204 resulting from the mirror edges. The detector elements shown by crosses 208 (x) represent the L-shaped patterns caused by wire 148.

It can be seen, that the whole pattern of of FIG. 14B can be reconstructed from the sensor elements marked by the squares and crosses. It takes, however, much less time to sample the picture information from the CCD line sensors than from a nearly continuous, two-dimensional array of sensor elements. In FIG. 14A, the longitudinal and transversal CCD line sensors have been shown one on top of the other. As this is not possible in practice, the actual arrangement is that of FIG. 13 with two beam splitters 158 and 160. The informations obtained are, of course, identical.

Figure 16:
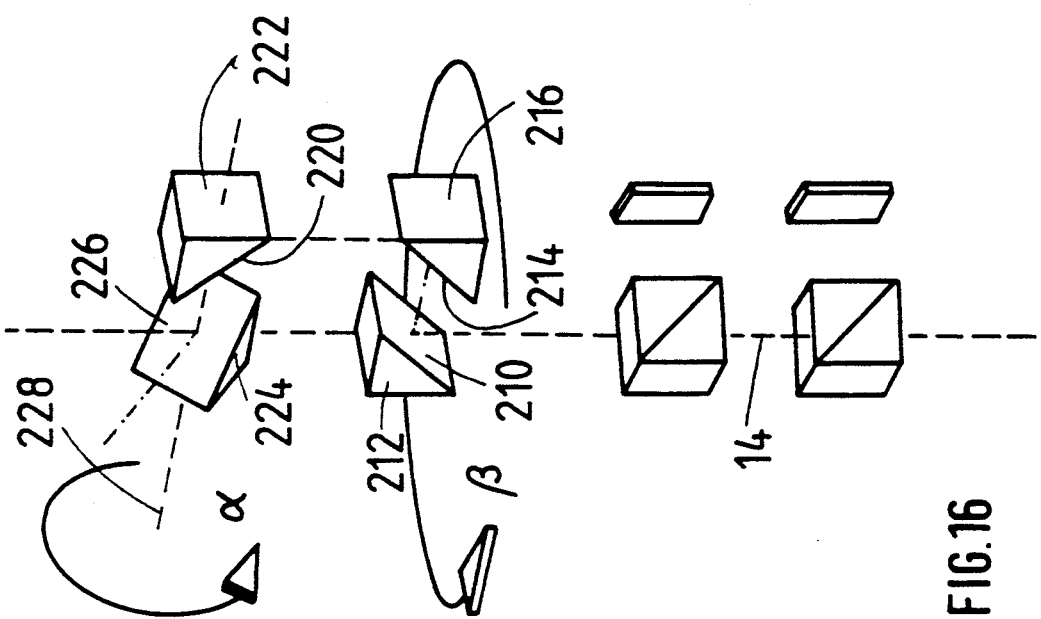
FIG. 16 is a schematic-perspective view similar to FIG. 15 and illustrates the angles of rotation of the movable elements in the device of FIG. 16.
Figure 15:
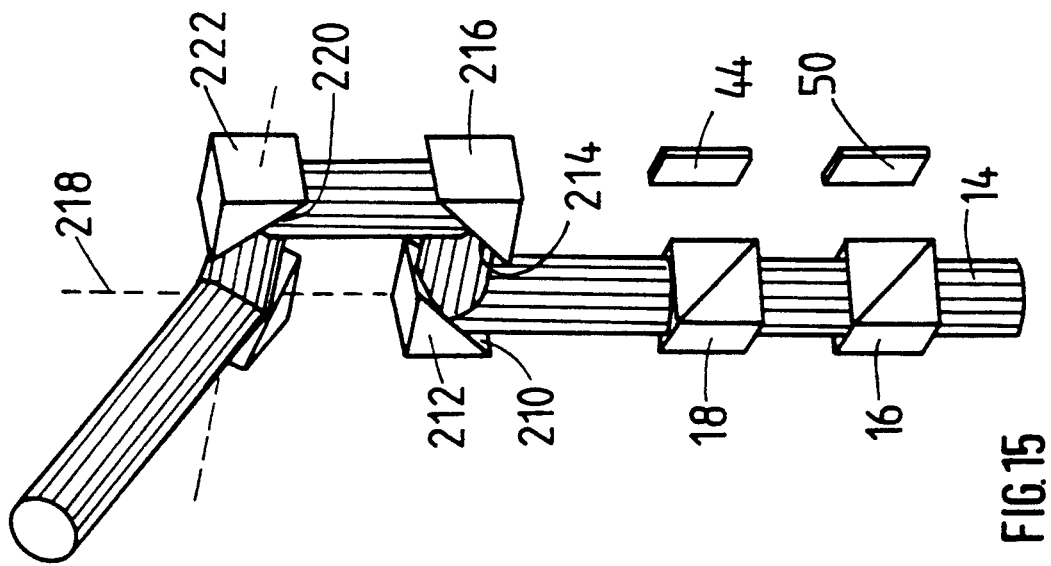
FIG. 15 is a schematic-perspective view of a modified design of the device for deflecting the laser beam towards the retro-reflector.

The cardanically mounted mirror 20 of FIG. 1 can be replaced by an optical structure of the type shown in FIGS. 15 and 16. The expanded laser beam 14 passes straight through polarizing beam splitters 16 and 18 and is deflected by a reflecting surface 210 of a prism 212. The laser beam 14 is directed to a reflecting surface 214 of a prism 216. The surface 210 deflects the laser beam 14 by 90°, whereby the laser beam 14 is now directed radial with respect to the original beam axis. The surface 214 deflects the laser beam 14 again by 90°. Thereby the laser beam 14 is again parallel to its original beam axis but laterally offset with respect thereto. The laterally offset laser beam 14 is again deflected radially inwards by a reflecting surface 220 of a prism 222. The laser beam 14 is then anti-parallel to the beam deflected by the surface 210. The prisms 212, 216 and 222 together are rotatable about an axis 218, which coincides with the original beam axis. The angle of rotation is designated $\beta$ in FIG. 16.

A prism 224 having a reflecting surface 226 is arranged on the axis 18 and in the path of the beam reflected by reflecting surface 220. This prism is rotatable about an axis 228. The angle of rotation of the prism 224 about axis 228 is designated $\alpha$. The cross sections of all of the prisms 212, 216, 222 and 224 are isosceles triangles having one right angle and two angles of 45° each. The reflecting surfaces 210, 214, 220 and 226 extend along the hypotenuses of the triangles and are arranged at an angle of 45° to the beam axes. Thereby the beams are deflected by 90°.

The arrangement described with reference to FIGS. 15 and 16 offers the advantage that the measured angles of rotation and $\beta$ directly represent the angles through which the laser beam 14 is deflected. This is different from the arrangement with the mirror 20, where each rotation of the mirror causes deflection of the beam through twice the angle.

I claim:

1. A device for non-contacting measurement of the orientation in space of a measuring object, comprising
    a retro-reflector rigidly attached to said object,
    reference mark means provided on said retro-reflector,
    light source means for generating a collimated light beam,
    beam directing means for directing said collimated light beam onto said retro-reflector, said light beam being returned by said retro-reflector substantially into itself,
    means for receiving said returned light beam for forming therefrom a picture of said reference mark means,
    picture detecting means for detecting said picture of said reference mark means and for providing corresponding picture information, and
    processing means for deriving, from said picture information, output data representing the orientation in space of said retro-reflector and thereby the orientation in space of said measuring object.

2. A device as claimed in claim 1, wherein said retro-reflector comprises three mutually orthogonal reflecting surfaces.

3. A device as claimed in claim 2, wherein said retro-reflector is a solid body of transparent material having three mutually orthogonal surfaces, said orthogonal surfaces reflecting light by total reflection and representing said reflecting surfaces.

4. A device as claimed in claim 1, wherein said reference mark means are reduced-reflection strips along adjacent edges of said reflecting surfaces.

5. A device as claimed in claim 1, wherein said reference mark means comprise separate bodies attached to said retro-reflector and extending into said light beam.

6. A device as claimed in claim 1, wherein said attached bodies define elongated structures.

7. A device as claimed in claim 1, wherein said light source means comprise a laser emitting a laser beam.

8. A device as claimed in claim 7, wherein said light source means further comprise beam expander means in the path of the laser beam for providing a collimated light beam of larger diameter than that of said laser beam.

9. A device as claimed in claim 1, wherein
    said light beam passes through a stationary section, where the path of rays of the light beam is stationary,
    said means for receiving said returned light beam comprising semi-transparent mirror means arranged in said stationary section of said returned light beam for deflecting part of said returned light beam to a plane where a picture with a pattern caused by said reference mark means is formed,
    said picture detecting means being arranged in said plane.

10. A device as claimed in claim 1, wherein said detecting means comprise a CCD sensor.

11. A device as claimed in claim 10, wherein said CCD sensor comprises a number of line scan sensors.

12. A device as claimed in claim 1, wherein said beam directing means comprises movable reflecting means for tracking, with said light beam, a movable measuring object.

13. A device as claimed in claim 12 and further comprising:
   detector means responsive to the lateral offset of the incident and returned beams caused by the reflection at said reflecting surfaces of said retro-reflector, and
   servo means controlled by said detector means for moving said reflecting means to reduce this lateral offset to zero and thereby to track said retro-reflector with said light beam.

14. A device as claimed in claim 13, and further comprising interferometer means for measuring the distance of said measuring object from said light source means to provide a distance information.

15. A device as claimed in claim 14, and further comprising
   means for sensing the movement of said movable reflecting means of said beam directing means to provide beam direction information, and
   computing means, to which said distance information and said direction information is applied to provide output data indicative of the position of said retro-reflector, and thereby of said measuring object.

16. A device as claimed in claim 13, wherein said beam directing means comprises a cardanically mounted mirror, said mirror being movable by a first servomotor about a first cardan axis and being movable by a second servomotor about a second cardan axis.

17. A device as claimed in claim 13, wherein said beam directing means comprises
   a first reflecting surface in said light beam and rotatable about a first axis of rotation coincident with the beam axis of said light beam,
   a second reflecting surface parallel to said first reflecting surface, laterally offset with respect to said first axis of rotation and rotatable about said first axis of rotation together with said first reflecting surface, said light beam being deflected by said first reflecting surface to said second reflecting surface, and being further deflected by said second reflecting surface in a direction parallel to said axis of rotation,
   a third reflecting surface in said further deflected light beam, said third reflecting surface being rotatable with said first and second reflecting surfaces and being arranged to re-deflect said light beam into the direction of a second axis of rotation orthogonal to said first axis of rotation, and
   a fourth reflecting surface in said re-deflected light beam on said second axis of rotation, said fourth reflecting surface being rotatable about said second axis of rotation to direct said light beam radially therefrom.

18. A device for non-contacting measurement of the orientation in space of a movable measuring object, comprising
   a retro-reflector having three mutually orthogonal reflecting surfaces, said retro-reflector being rigidly attached to said measuring object, reference mark means provided on said retro-reflector,
   a laser emitting a laser beam and beam expander means in the path of the laser beam for providing a collimated light beam of larger diameter than that of said laser beam,
   said light beam passing through a stationary section, where the path of rays of the light beam is stationary, to beam directing means for directing said collimated light beam onto said retro-reflector, said light beam being returned by said retro-reflector substantially into itself, said beam directing means comprising movable reflecting means for tracking, with said light beam, said movable measuring object
   semi-transparent mirror means arranged in said stationary section of said returned light beam for deflecting part of said returned light beam to a plane where a picture with a pattern caused by said reference mark means is formed,
   picture detecting means, arranged in said plane, for detecting said picture of said reference mark means and for providing corresponding picture information, and
   processing means for deriving, from said picture information, output data representing the orientation in space of said retro-reflector and thereby the orientation in space of said measuring object.

19. A device as claimed in claim 18, wherein said detecting means comprise a CCD sensor.

20. A device as claimed in claim 19, wherein said CCD sensor comprises a number of line scan sensors.

21. A device as claimed in claim 18, and further comprising interferometer means for measuring the distance of said measuring object from said light source means to provide a distance information.

22. A device as claimed in claim 21, and further comprising
   means for sensing the movement of said movable reflecting means of said beam directing means to provide beam direction information, and
   computing means, to which said distance information and said direction information is applied to provide output data indicative of the position of said retro-reflector, and thereby of said measuring object.

* * * * *